(12) United States Patent
Scipio

(10) Patent No.: US 6,505,362 B1
(45) Date of Patent: Jan. 14, 2003

(54) METHOD AND SYSTEM FOR CUSHIONING A MOBILE PRONE PERSON

(76) Inventor: Thomas Scipio, 5 Valley View Dr., Blue Grass, IA (US) 52726

(*) Notice: Subject to any disclaimer, the term of this patent is extended or adjusted under 35 U.S.C. 154(b) by 54 days.

(21) Appl. No.: 09/669,502

(22) Filed: Sep. 25, 2000

(51) Int. Cl.[7] .............................................. A47C 19/00
(52) U.S. Cl. .............................................. 5/118; 5/611
(58) Field of Search ..................... 5/118, 611; 105/316; 114/192

(56) References Cited

U.S. PATENT DOCUMENTS

| | | | | |
|---|---|---|---|---|
| 3,371,359 A | * | 3/1968 | Dome | 5/118 |
| 4,144,601 A | * | 3/1979 | Anderson et al. | 5/118 |
| 4,497,078 A | * | 2/1985 | Vogel et al. | 5/118 |
| 4,556,198 A | * | 12/1985 | Tominaga | 5/611 |
| 4,979,248 A | * | 12/1990 | Kelley | 5/118 |
| 4,989,281 A | * | 2/1991 | Christensen | 5/118 |
| 5,218,728 A | * | 6/1993 | Lloyd et al. | 5/118 |
| 6,263,527 B1 | * | 7/2001 | Ross et al. | 5/118 |

* cited by examiner

Primary Examiner—Alexander Grosz
(74) Attorney, Agent, or Firm—Simmons, Perrine, Albright & Ellwood, PLC

(57) ABSTRACT

An air suspension bed for use in over-the-road trucks which utilizes an automotive air shock and a mechanical suspension to support a mattress, for use while a truck is in motion.

19 Claims, 5 Drawing Sheets

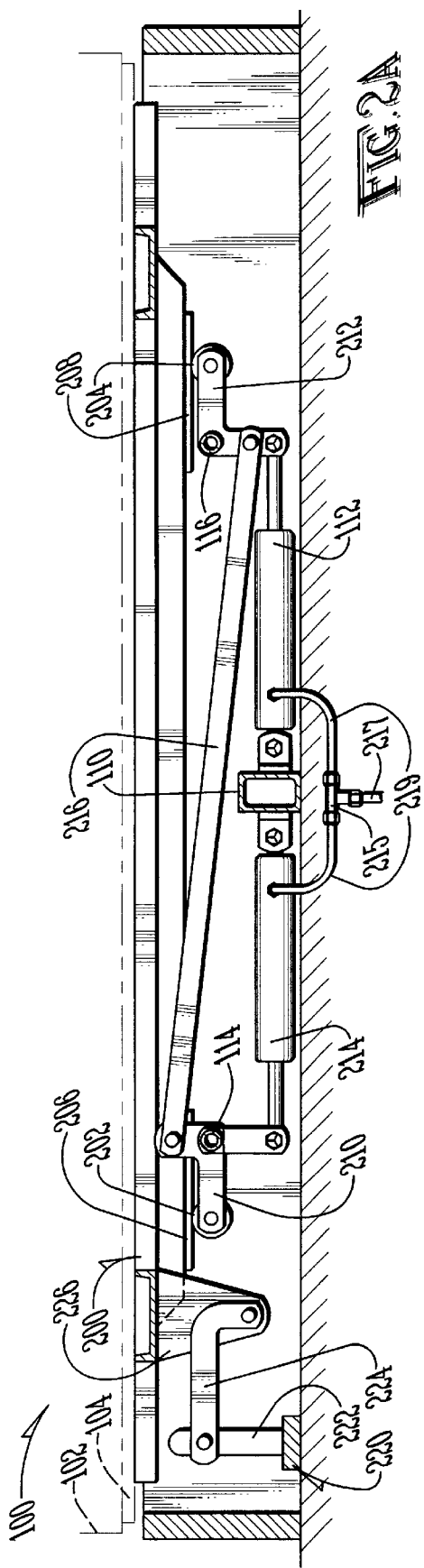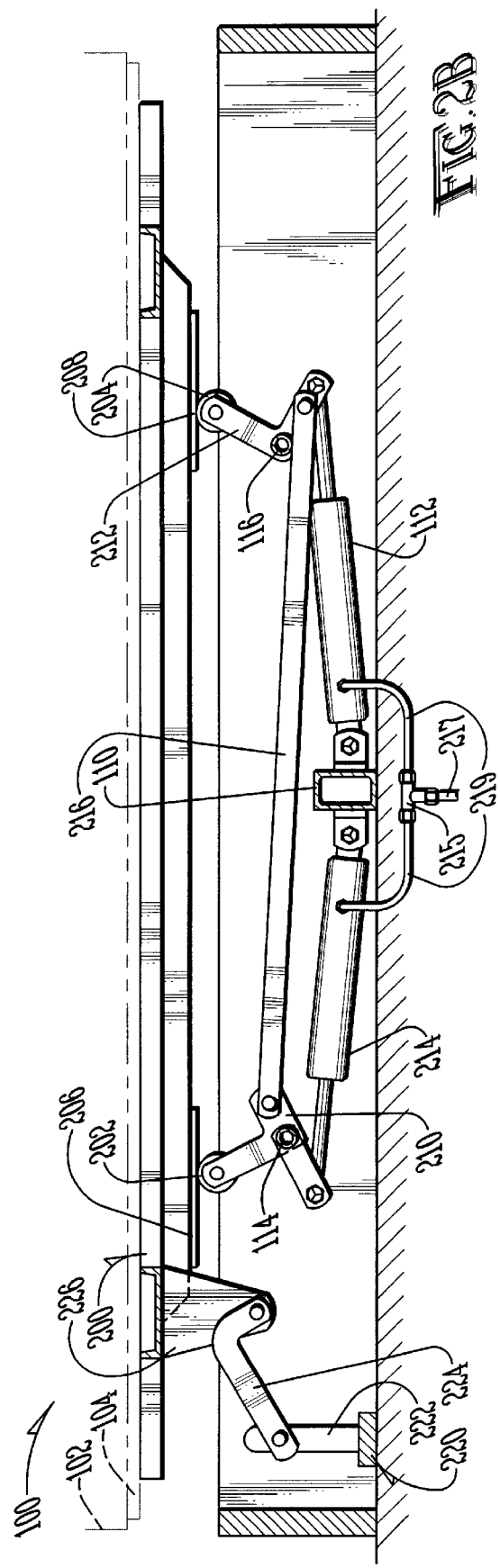

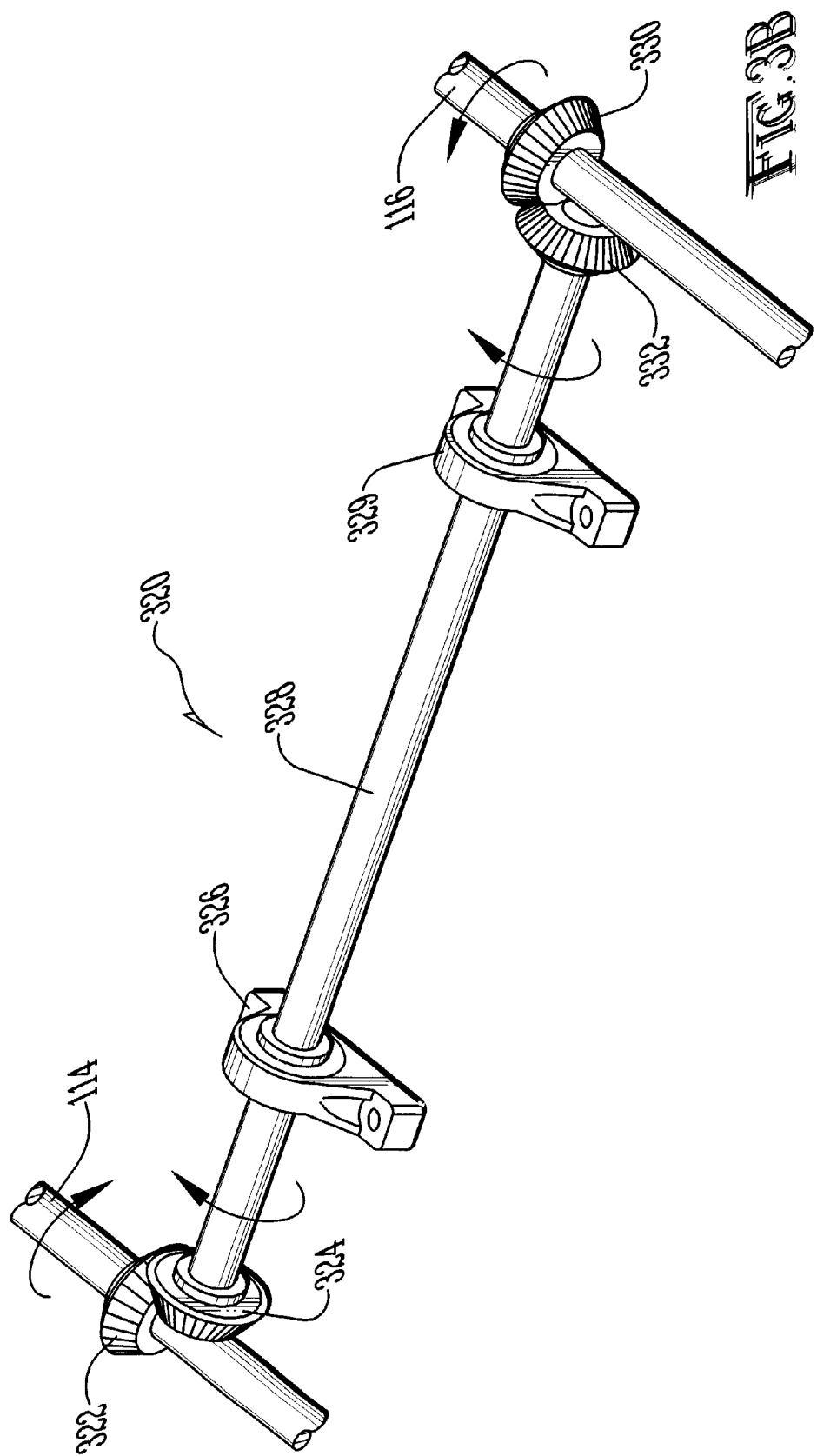

METHOD AND SYSTEM FOR CUSHIONING A MOBILE PRONE PERSON

FIELD OF THE INVENTION

The present invention generally relates to beds, and more particularly relates to mobile beds, and even more particularly relates to methods and systems for using compressed air to cushion a mobile prone person.

BACKGROUND OF THE INVENTION

In the past, over the road, or long-distance truck drivers have often included mattresses in sleeper compartments coupled to their trucks. These sleeping compartments may or may not have a set of springs in conjunction with the mattress. These mattresses have proven to be very popular for providing a convenient and comfortable place for the trucker to sleep while stopped for the night or for naps during the day.

While these mattress and spring combinations have been used extensively in the past, they do have some drawbacks. One major problem with these beds occurs when the truck is in motion and one driver of a team of two or more drivers, attempts to sleep while the other is driving. During such times, the simple mattress and spring approach is often inadequate, especially while driving on rough roads. The sleeping partner is often rudely awakened when the truck encounters a bump in the road. Thereafter, it may be difficult for that person to fall back to sleep before the other driver is in need of relief.

Consequently, there exists a need for improved methods and systems for cushioning a mobile prone person.

SUMMARY OF THE INVENTION

It is an object of the present invention to provide a system and method for cushioning a prone mobile person in an efficient manner.

It is a feature of the present invention to utilize a bed having an air suspension system.

It is another feature of the present invention to include an air shock and mechanical suspension system.

It is an advantage of the present invention to achieve improved cushioning for mobile prone passengers in an over-the-road truck.

The present invention is an apparatus and method for cushioning a mobile prone person designed to satisfy the aforementioned needs, provide the previously stated objects, include the above-listed features, and achieve the already articulated advantages. The present invention is carried out in a "jolt-less" manner in a sense that the strong jolts that are often felt by a sleeping passenger when the truck hits a bump have been greatly reduced.

Accordingly, the present invention is a system and method including an air suspension system for a mobile bed, which includes an air shock, and a mechanical suspension system.

BRIEF DESCRIPTION OF THE DRAWINGS

The invention may be more fully understood by reading the following description of the preferred embodiments of the invention, in conjunction with the appended drawings wherein:

FIG. 2A is a side view of a partially dismantled bed of the present invention, which is deployed in a stowed position.

FIG. 2B is a side view of a partially dismantled bed of the present invention, which is deployed in an operating position.

FIG. 3B is a side view of an alternate embodiment of a mechanical suspension section of the present invention.

DETAILED DESCRIPTION

Figure 1:
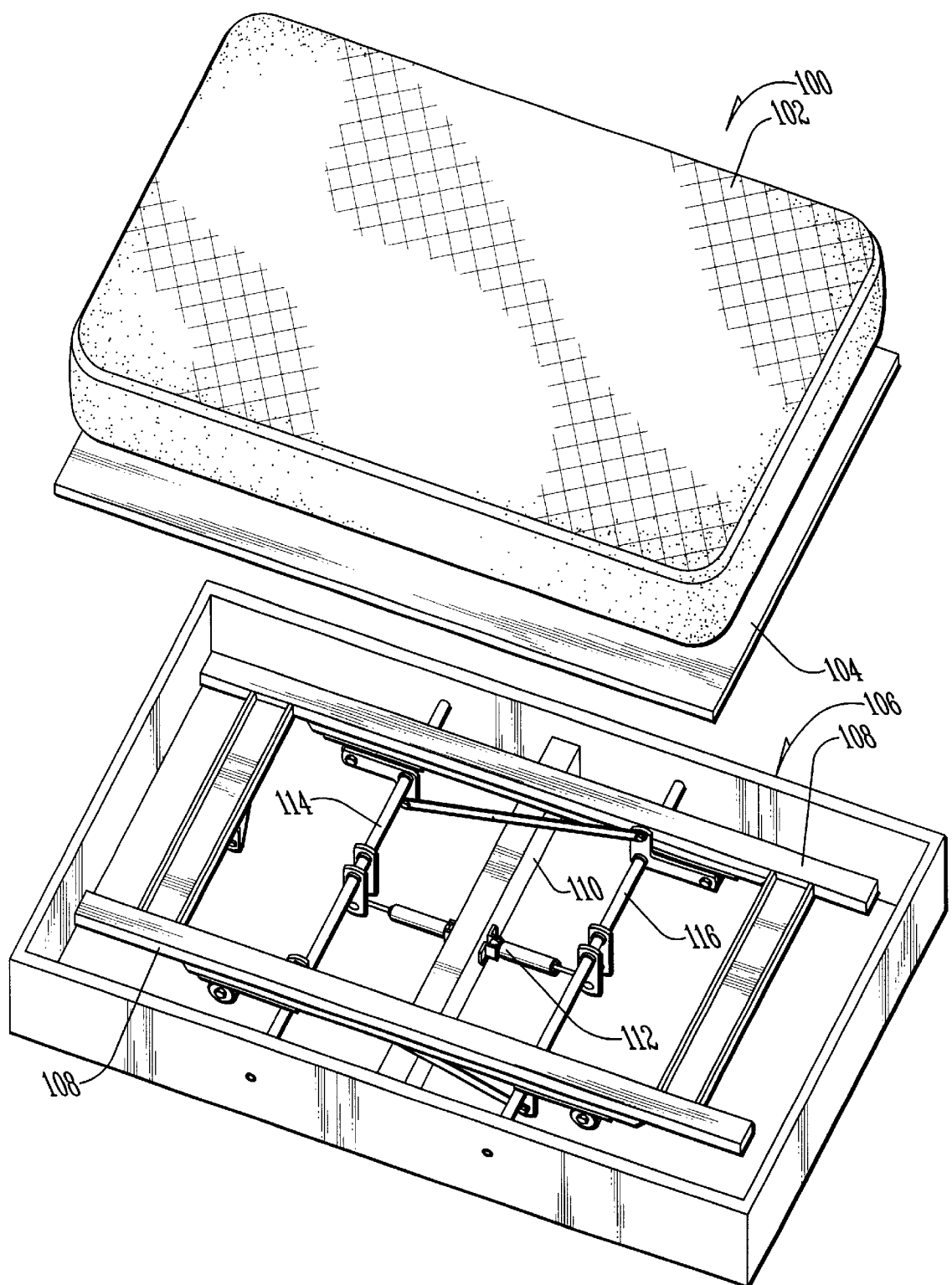
FIG. 1 is a perspective view of an air suspension bed system of the present invention.

Now referring to the drawings wherein like numerals refer to like matter throughout, and more specifically referring to FIG. 1, there is shown a perspective view of the system of the present invention generally designated 100, including a mattress 102, for positioning on top of a mattress baseboard 104, which is coupled to or resting upon mattress baseboard support rails 108, which are mechanically coupled to box frame 106, which has a box frame center support cross member 110. The material used for mattress baseboard 104, box frame 106, and mattress baseboard support rails 108 is a matter of designer's choice, but it is believed that wood may be a preferred material. However, it is contemplated that various types of plastic materials, as well as metals, could be used as well. The mechanical coupling is provided through various mechanical components, only a few of which are shown in this simplified perspective view such as first end main shaft 114, second end main shaft 116, and second end air shock 112. The mechanical couplings and other movable components of the present invention may be made of various materials, but it is believed that high strength and lightweight metals may be preferred.

A more detailed understanding of the present invention can be achieved by now referring to FIG. 2A, which shows a portion of the bed 100 of FIG. 1, where some of the box frame 106 is omitted to reveal the mechanisms therein. The bed is shown in a stowed position with the mattress baseboard support rails 108 in their home or most downwardly positions. The bed 200 is supported and lifted by first end roller 202 and second end roller 204, which engage with first end race 206 and second end race 208, respectively. Preferably, the races are made of hardened metal. First end roller 202 and second end roller 204 are caused to move when first end lift arm 210 and second end lift arm 212 are raised. First end lift arm 210 and second end lift arm 212 are coupled to box frame center support cross member 110 via first end main shaft 114 and second end main shaft 116 and first end air shock 214 and second end air shock 112, respectively. When air is supplied via air source supply line 217 to air line splitting connector 215, and then via air shock supply line 219 to first end air shock 214 and second end air shock 112, the shocks expand in a well-known manner. First end air shock 214 and second end air shock 112 may be an automotive air shock or other known air-powered suspension apparatus which is suitable. When first end air shock 214 and second end air shock 112 expand, mattress baseboard support rails 108 are raised to a position which is shown in FIG. 2B.

Now referring to FIG. 2B, there is shown a bed 200 in an operating position, with the first end air shock 214 and second end air shock 112 having extended lengths. Lift arm cross-stabilizer 216 maintains stability of the bed 200, as well as maintaining a constantly level mattress baseboard 104. To further enhance stability of the mattress baseboard 104, there is shown a support rail stabilizing assembly 220, which includes a support rail stabilizing fixed upright member 222 and a support rail stabilizing hinged member 224 which cooperate with support rail stabilizing bracket 226.

It should now be noted that the principles of the present invention could be carried out in several different ways. For example, it is contemplated that a first end roller 202 and second end roller 204 could be of an extended width dimension and extend across a large central portion of mattress baseboard support rails 108 (assuming a central panel is included which is not shown in FIG. 1). While this is not a preferred design, it should be understood that wide centrally disposed rollers could be used. It should also be understood that in a preferred embodiment, there will be four or more rollers where the rollers are much narrower than a centrally disposed roller. A system with four rollers somewhat positioned toward the corners of mattress baseboard support rails 108 may be preferred. It should also be understood that even more rollers may be used as well. The precise number, size, shape, and orientation of rollers are a matter of designer's choice which is expected to vary depending upon other design choices made. One of the common characteristics of any variation of the present invention is that there will be at least two rollers which are separated and which are caused to move in unison when the bed is raised or lowered. This simultaneous motion provides for a level mattress baseboard 104 and mattress 102. There are various ways to accomplish this.

It should be understood that the present invention could be accomplished without rollers. A pivoting pillar block with a lineal bearing and shaft anchored to the mattress support could be used as well.

While FIGS. 2A and 2B are side views showing only a single side of the present invention, it should be understood that a second side exists and will be readily understandable from this discussion and drawings of a single side.

Figure 3A:
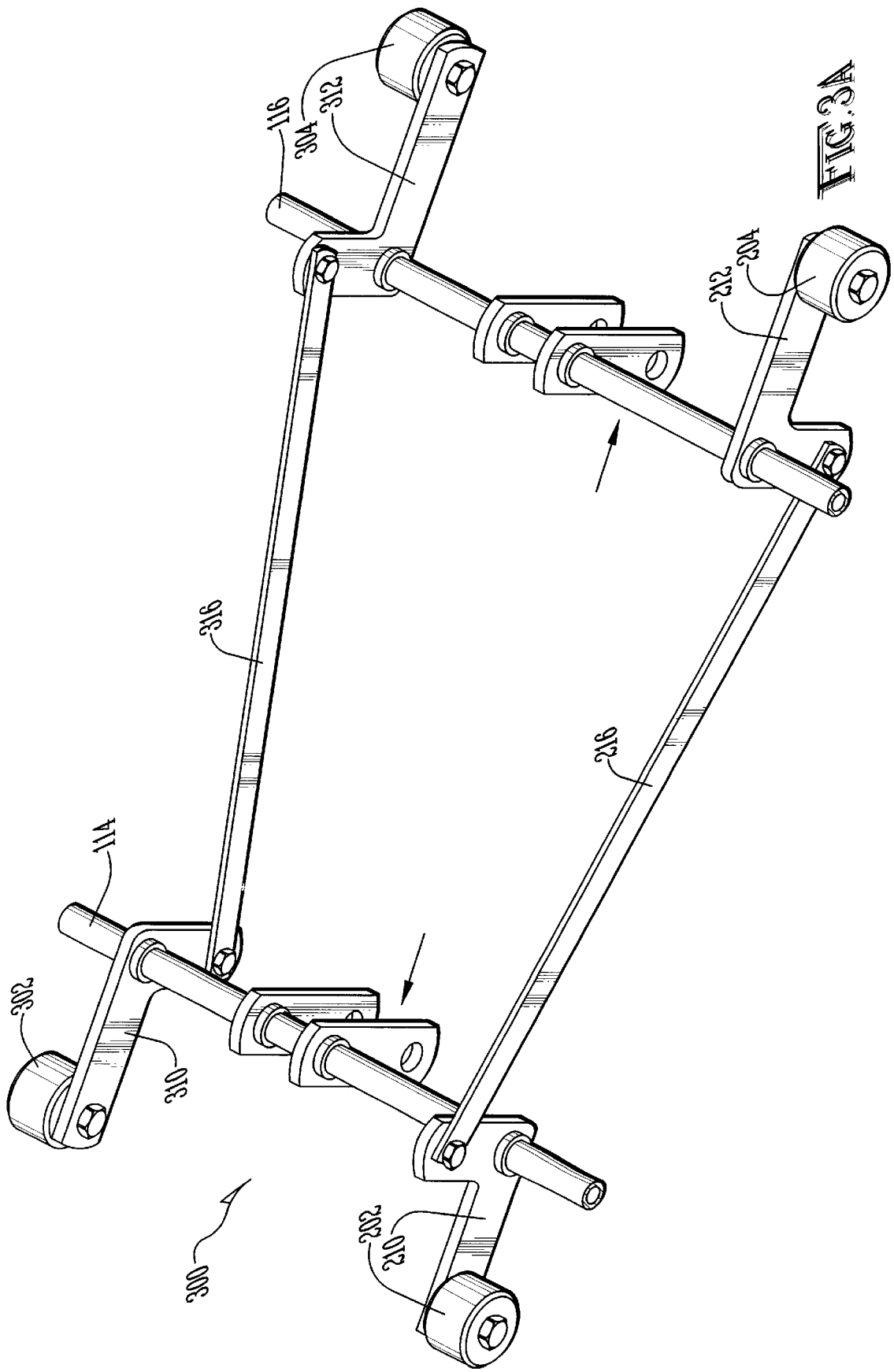
FIG. 3A is a side view of a mechanical suspension section of the present invention.

Now referring to FIG. 3A, there is shown one embodiment of the present invention which includes four rollers: first end roller 202, second end roller 204, first end opposing roller 302, and second end opposing roller 304. There is also shown first end opposing lift arm 310 coupled to first end opposing roller 302 and a second end opposing lift arm 312 coupled to second end opposing roller 304. Opposing lift arm cross-stabilizer 316 provides the necessary coupling between the first end and the second end of the mechanism. First end opposing roller 302 and second end opposing roller 304 are coupled with first end roller 202 and second end roller 204 respectively via first end main shaft 114 and second end main shaft 116 respectively. This arrangement provides for a level mattress 102 irrespective of its vertical position. Opposing lift arm cross-stabilizer 316 and lift arm cross-stabilizer 216 are shown as rigid bars; however, if weight concerns are paramount, then it should be understood that a lighter flexible material, such as wire, rope, etc., could be used as well for both of these lift arm cross-stabilizers.

It should also be noted that the present invention could function with only a single lift arm cross-stabilizer if it is a rigid bar capable of both pushing and pulling. The orientation of lift arm cross-stabilizer 216 with respect to lift arms 210 and 212 is also important. One end of the cross-stabilizer 216 is coupled to a point on lift arm 212, which is above the shaft 116 and below the shaft 114 with respect to lift arm 210. The engagement of the end of cross-stabilizer 216 and lift arms 210 and 212 should be matched so as to provide continuous level operation of the bed. In an alternate embodiment which may be more desirable for certain low profile applications, the lift arm cross stabilizers 216 and 316 can be horizontal if their respective lift arms are oriented in the same direction. FIG. 3A shows lift arms 210 and 212 arranged in opposing directions.

It should be noted that FIG. 1 shows a single second end air shock 112 and FIGS. 2A and 2B show two shocks. This, too, is a matter of designer's choice, and it is expected that numerous cost, weight, and performance-based trade-offs will be made when any particular bed is designed.

Instead of the mechanism shown in FIG. 3A, it is contemplated that an alternate approach could be used. The mechanism of FIG. 3B is representative of various arrangements that could be used to accomplish similar results. Now referring to FIG. 3B, there is shown an alternate method for coupling the various rollers. There is shown a rotary motion transfer gearing system 320 which transfers rotary motion of first end main shaft 114 into rotary motion of cross-coupling shaft 328. This is accomplished by second end main shaft gear 332 and first end cross-coupling shaft gear 324. Cross-coupling shaft 328 is supported by first end cross-coupling shaft bracket 326 and second end cross-coupling shaft bracket 329. Rotary motion of cross-coupling shaft 328 is transferred then to second end main shaft 116 via second end rotary motion transfer gearing system 330, which includes second end main shaft gear 332 and first end cross-coupling shaft gear 324.

Figure 4:
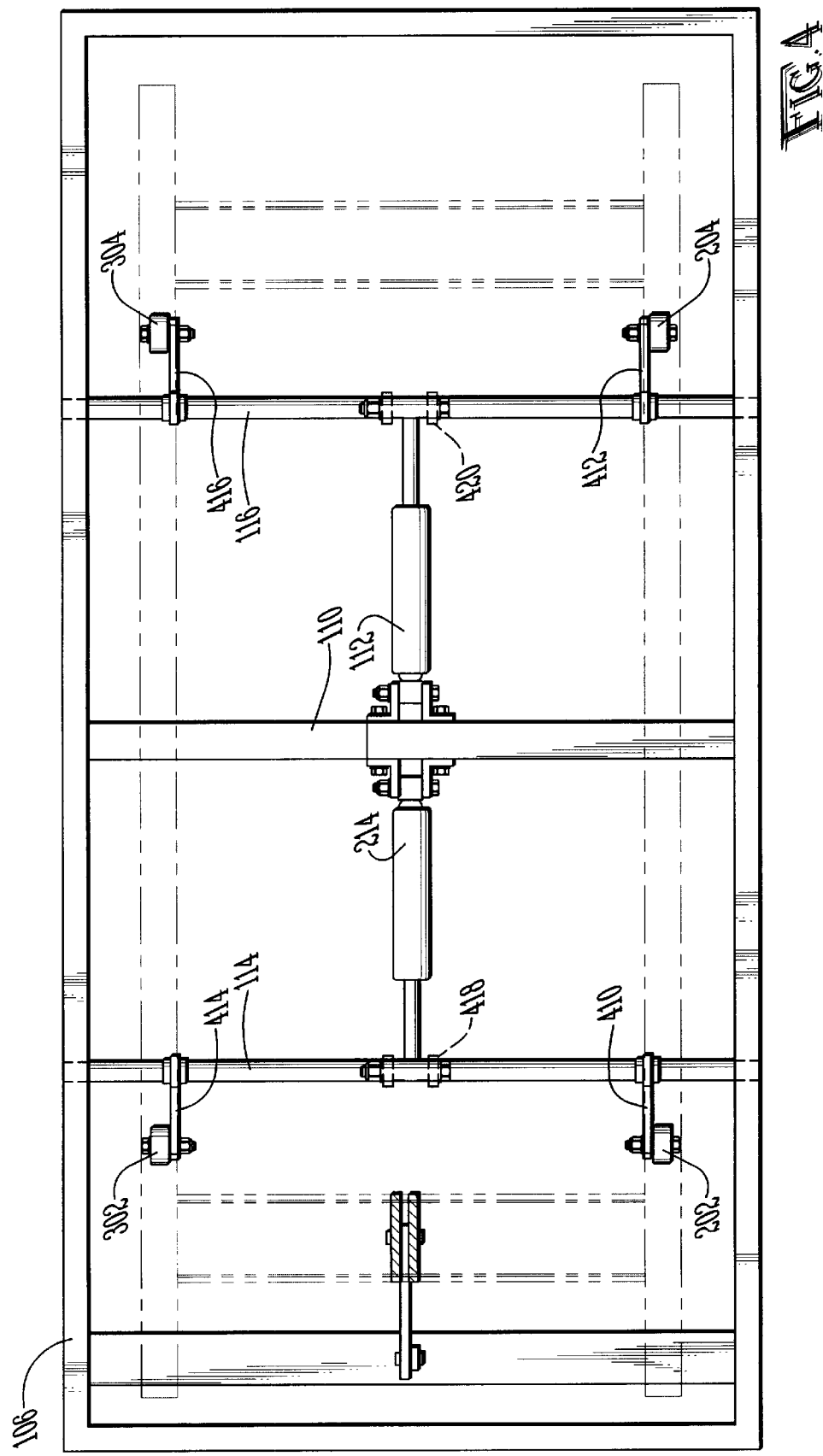
FIG. 4 is a top view of a partially dismantled bed of the present invention.

Now referring to FIG. 4, there is shown a top view of a bed of the present invention, where portions of the bed have been removed to aid in understanding of the operation of the components remaining, where four rollers are deployed generally in the corners. More specifically, there is shown a first end isolated lift arm 410, a second end isolated lift arm 412, a first end isolated opposing lift arm 414, and a second end isolated opposing lift arm 416, which are coupled respectively to first end roller 202, second end roller 204, first end opposing roller 302, and second end opposing roller 304. The lift arms here are isolated from the first end air shock 214 and the second end air shock 112. (Note: in FIGS. 2A and 2B, the shocks are shown as directly coupled to first end lift arm 210 and second end lift arm 212. This is a matter of designer's choice. However, when the lift arms are isolated from the shocks, then first end isolated central air shock coupling 418 and second end isolated central air shock coupling 420 could be used to cause rotation of first end main shaft 114 and second end main shaft 116 respectively when first end air shock 214 and second end air shock 112 are respectively extended. Box frame center support cross member 110 is shown in this FIG. 4 as a single solid cross member; this, too, is a matter of designer's choice, and the present invention is intended to cover many different structures which are suitable.

In operation, the apparatus and method of the present invention as described in FIGS. 1–4, could function as follows:

A person lies upon the mattress 102. Air is supplied from a source of compressed air (not shown) to the first end air shock 214 and second end air shock 112, which are caused to extend. This extension results in a pivoting of first end lift arm 210 and second end lift arm 212 around first end main shaft 114 and second end main shaft 116 respectively. This pivoting motion, because of the separation of first end roller 202 and second end roller 204 from their respective shafts, results in a lifting of the mattress 102 to a higher or operating position. Then, when the truck carrying the bed 100 hits a bump, some of the force which would normally impact the mattress 102 is absorbed through first end air shock 214 and second end air shock 112, resulting in a compression of these shocks and a reduced separation between the mattress baseboard 104 and the box frame 106.

Throughout this description, reference is made to over-the-road trucks and to bumps in the road, because it is believed that the beneficial aspects of the present invention would be most readily apparent when used in connection with such trucks; however, it should be understood that the present invention is not intended to be limited to trucks and should be hereby construed to include other transportation devices as well, such as boats and airplanes.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A bed comprising:
    a frame, for contact and cooperation with a surface in a vehicle;
    a mattress, for cushioning a person;
    a mattress support structure for contacting and providing support to the mattress;
    a suspension system between said mattress support structure and said frame for providing cushioning of a person on the mattress when said vehicle is caused to abruptly move in a direction having a vertical component;
    wherein said suspension system includes a shock;
    wherein said suspension system cooperates with said mattress support structure through the use of a plurality of rollers, which move with respect to said mattress support structure, where motion of said rollers results in a vertical displacement between said frame and said mattress support structure;
    wherein said plurality of rollers is each coupled to an arm rigidly coupled to a shaft; and
    wherein said arm provides lift to said mattress support structure when said shock provides force on said arm.

2. A bed of claim 1 wherein each of said plurality of rollers is not co-axial with said shaft.

3. A bed comprising:
    a frame, for contact and cooperation with a surface in a vehicle;
    a mattress, for cushioning a person;
    a mattress support structure for contacting and providing support to the mattress;
    a suspension system between said mattress support structure and said frame for providing cushioning of a person on the mattress when said vehicle is caused to abruptly move in a direction having a vertical component;
    wherein said suspension system includes an air shock;
    wherein said suspension system cooperates with said mattress support structure through the use of a plurality of rollers, which move with respect to said mattress support structure, where motion of said rollers results in a vertical displacement between said frame and said mattress support structure;
    wherein said plurality of rollers is each coupled to an arm rigidly coupled to a shaft;
    wherein said arm provides lift to said mattress support structure when said shock provides force on said arm;
    wherein each of said plurality of rollers is not co-axial with said shaft; and
    wherein each of said lift arms is rigidly coupled to said shaft.

4. A bed of claim 3 wherein at least two of said plurality of rollers are cause to move vertically in unison when one of either of said at least two of said plurality of rollers is caused to move.

5. A bed of claim 4 wherein a cross-coupling member is used to provide coordination in movement between rollers.

6. A bed of claim 5 wherein said cross-coupling member is an elongated rigid member.

7. A bed of claim 6 wherein said coordination is provided by a translational motion of said elongated rigid member.

8. A bed of claim 7 further comprising a support rail stabilizing assembly disposed between said mattress support structure and said frame for providing stabilization therebetween.

9. A bed of claim 8 wherein said air shock is coupled to a rigid cross member of said frame.

10. A bed of claim 9 wherein each of said plurality of rollers engages a race coupled to said mattress support structure.

11. A bed of claim 10 wherein said plurality of lift arms is operatively coupled to said air shock through a rotary motion of said shaft.

12. A bed of claim 10 wherein said plurality of lift arms is operatively directly coupled to said air shock through a translational motion.

13. A bed of claim 11 wherein said vehicle is an over-the-road truck.

14. A bed of claim 13 wherein said air shock is an automotive air shock.

15. A bed of claim 5 wherein said cross-coupling member comprises a horizontal cross-stabilizer extending between and coupled to said arm coupled to each of said plurality of rollers wherein each of said arms is oriented in a single direction.

16. A bed of claim 6 wherein said coordination is provided by a rotational motion of said elongated rigid member, where a direction of rotation of said elongated member is orthogonal to a direction of rotation of said shaft.

17. A bed of claim 16 wherein said shaft and said elongated member are coupled by two orthogonal meshing gears.

18. A method of cushioning a prone person in a moving apparatus comprising the steps of:
    providing a mattress;
    supporting said mattress with a suspension system disposed below the mattress;
    raising the mattress by providing compressed air to an air shock which causes the lifting arm to apply lifting force to one of said plurality of rollers;
    said suspension system including a plurality of rollers which move along a plane defined by a top surface of said mattress; cushioning said person from jolts associated with said moving apparatus, by allowing said air shock to be compressed, thereby causing said rollers to move along said plane and further resulting in relative vertical motion between said mattress and a surface of said moving apparatus upon which suspension system is disposed; and
    providing a lifting arm coupled to one of said plurality of rollers.

19. A bed comprising:
    a mattress, adapted and configured for receiving completely thereon a prone adult person;
    a mattress baseboard for supporting said mattress;

a rectangular mattress baseboard support rail assembly for supporting said mattress baseboard;

a first race coupled to said mattress baseboard support rail assembly, for receiving a roller thereon;

a second race coupled to said mattress baseboard support rail assembly, for receiving a roller thereon;

a third race coupled to said mattress baseboard support rail assembly, for receiving a roller thereon;

a fourth race coupled to said mattress baseboard support rail assembly, for receiving a roller thereon;

said first race, said second race, said third race, and said fourth race are arranged in a rectangular array;

a first roller, a second roller, a third roller, and a fourth roller coupled to said first race, said second race, said third race and said fourth race respectively;

a first lift arm for coupling said first roller with a first end rotatable shaft, constructed of a round metallic rod;

a second lift arm for coupling said second roller with a second end rotatable shaft;

a third lift arm for coupling said third roller to said first end rotatable shaft;

a fourth lift arm for coupling said fourth roller to said second end rotatable shaft;

a first end isolated central air shock coupling for coupling an air shock to said first end rotatable shaft, said first end isolated central air shock coupling is centered between said first lift arm and said third lift arm;

a first lift arm cross-stabilizer, pivotally coupled at each end, between said first lift arm and said second lift arm for providing, via a translational motion of said first lift arm cross-stabilizer, coordinated movement of said first roller and said second roller when said first lift arm is caused to rotate around said first end rotatable shaft, as a result of a change in linear extent of said air shock, when said air shock is pivotally coupled to a central cross support member of a rectangular shape frame;

said coordinated movement of said first roller and said second roller is constrained, in a horizontal direction, to motion along a plane parallel with a plane defined by a top surface of said mattress; and, said coordinated movement of said first roller and said second roller resulting in a decrease in horizontal displacement therebetween when said mattress baseboard is cause to increase vertical displacement with respect to said frame.

* * * * *